United States Patent [19]

Tsang et al.

[11] Patent Number: 5,472,594
[45] Date of Patent: Dec. 5, 1995

[54] FCC PROCESS FOR PRODUCING ENHANCED YIELDS OF $C_4/C_5$ OLEFINS

[75] Inventors: Chih-Hao M. Tsang, Houston; Laurence D. Neff; Pei-Shing E. Dai, both of Port Arthur, all of Tex.

[73] Assignee: Texaco Inc., White Plains, N.Y.

[21] Appl. No.: 276,730

[22] Filed: Jul. 18, 1994

[51] Int. Cl.$^6$ .................................................. C10G 11/05
[52] U.S. Cl. ........................... 208/114; 208/120; 208/122
[58] Field of Search ..................................... 208/114, 120, 208/122

[56] References Cited

U.S. PATENT DOCUMENTS

| | | | |
|---|---|---|---|
| 5,231,064 | 7/1993 | Absil et al. | 502/68 |
| 5,318,696 | 6/1994 | Kowalski | 208/114 |
| 5,348,643 | 9/1994 | Absil et al. | 208/114 |
| 5,378,670 | 1/1995 | Kumar | 502/60 |

Primary Examiner—Asok Pal
Assistant Examiner—Bekir L. Yildirim
Attorney, Agent, or Firm—James L. Bailey; Kenneth R. Priem; Cynthia L. Hunter

[57] ABSTRACT

Disclosed is a process for converting a hydrocarbon charge to a product containing improved yields of $C_4/C_5$ olefins with a reduction in the loss of gasoline yield which comprises:

passing said hydrocarbon charge into contact with a catalyst comprising a phosphorus-containing medium pore zeolite mixed as an additive with Y-zeolite in a weight ratio of 0.005 to 0.10, said zeolites in separate or composite spray dried particles, wherein the catalyst to oil ratio is 0.1 to 10, reacting said hydrocarbon charge at a temperature of 800° F. to 1200° F., a pressure of 0 to 150 psig, and in the absence of added hydrogen, thereby producing a product containing improved yields of $C_4/_5$ olefins and reduced loss in gasoline yield.

10 Claims, No Drawings

FCC PROCESS FOR PRODUCING ENHANCED YIELDS OF $C_4/C_5$ OLEFINS

CROSS-REFERENCE

This application is related to U.S. Ser. application No. 08/239,052.

1. Field of the Invention

This invention relates to catalytic cracking of hydrocarbon oils to produce liquid hydrocarbons boiling in the gasoline and distillate range. More particularly, this invention relates to a method for enhancing the yield of $C_4/C_5$ olefins in a catalytic cracking process. These $C_4/C_5$ light olefins are the essential feedstocks for alkylation, MTBE and TAME units.

2. Background of the Invention

Catalytic cracking is routinely used to convert heavy petroleum fractions to lighter products and fluidized catalytic cracking is particularly advantageous. The heavy feed contacts hot regenerated catalysts and is cracked to lighter products.

In most modern FCC units the hot regenerated catalyst is added to the feed at the base of the riser reactor. The fluidization of the solid catalyst particles may be promoted with a lift gas.

Steam can be used in an amount equal to about 1–5 wt % of the hydrocarbon feed to promote mixing and atomization of the feedstock. Preheated charge stock (150°–375° C.) is mixed with hot catalyst (>650° C.) from the regenerator. The heat from the regenerated catalyst is used to vaporize and heat the feed to the desired cracking temperature, usually 450°–600° C. During the upward passage of the catalyst and feed, the feed is cracked and coke deposits on the catalyst. The cracked products and coked catalyst exit the riser and enter a solid-gas separation system, e.g., a series of cyclones, at the top of the reactor vessel. The cracked hydrocarbon products are typically fractionated into a series of products, including gas, gasoline, light cycle gas oil and heavy cycle gas oil. Some heavy cycle gas oil may be recycled to the reactor. The bottoms product, a "slurry oil" is conventionally allowed to settle. The solids portion of the settled product rich in catalyst particles may be recycled to the reactor.

The following references, which contain good overviews of FCC processes are incorporated herein by reference: U.S. Pat. Nos. 3,152,065 (Sharp et al.); 3,261,776 (Banman et al.); 3,654,140 (Griffel et al.); 3,812,029 (Snyder); 4,093, 537; 4,118,337; 4,118,338; 4,218,306 (Gross et al.); 4,444, 722 (Owen); 4,459,203 (Beech et al.); 4,639,308 (Lee); 4,675,099; 4,681,743 (Skraba) as well as in Venuto et al., Fluid Catalytic Cracking With Zeolite Catalysts, Marcel Dekker, Inc. (1979).

The FCC octane barrel catalyst (i.e. a catalyst which permits attainment of both octane number and gasoline yield) typically contains ultrastable Y-zeolites or dealuminated Y-zeolites. The ultrastable Y-zeolite is generally obtained by hydrothermal or thermal treatment of the ammonium or hydrogen form of the Y-type zeolite at temperatures above 1000° F. in the presence of steam. Ultrastabilization by hydrothermal treatment was first described by Maher and McDaniel in the U.S. Pat. No. 3,374,056. U.S. Pat. No. 3,449,070 to McDaniel et al. discloses a method of producing an ultrastable Y-zeolite by base exchanging a charge faujasite zeolite to reduce the alkali metal content. The Unit Cell Size of the product is 24.40 Å–24.55 Å. Ammonium exchange and a second hydrothermal treatment at a temperature of about 1300° F. to 1900° F. further reduces the Unit cell Size down to 24.20 Å to 24.45 Å. Hydrothermal treatment removes tetrahedral aluminum from the framework but not from the zeolite cages or channels where it remains as a hydrated cation or an amorphous oxide.

Commonly used FCC base catalysts include finely divided acidic zeolites such as, for example, Rare-Earth Y (REY), Dealuminized Y (DAY), Ultrastable Y (USY), Rare-Earth Containing Ultrastable Y (RE-USY) and Ultrahydrophobic Y (UHP-Y). The FCC catalysts are typically fine particles having particle diameters ranging from about 20 to 150 microns and an average diameter around 60–80 microns.

Though many improvements have been made in the FCC process, a number of problem areas remain. In addition, some process variables change depending upon the desired products. For example, one area of interest is the yield of $C_3$–$C_5$ olefins. As mentioned, they can provide feedstocks for alkylation, MTBE and TAME.

Methyl tertiary butyl ether (MTBE) and tertiary amyl methyl ether (TAME) are finding increasing use as blending components in high octane gasoline as the current gasoline additives based on lead are phased out. With the expanding use of these ethers as acceptable gasoline additives, a growing problem is the availability of raw materials. $C_4$–$C_5$ olefins can be used as precursors for desired oxygenates in the reformulated gasoline. With the passage of the "Clean Air Act" to meet future reformulated gasoline requirements, the olefin production from an FCC unit will play an important role in meeting the need for oxygenates and producing additional alkylates.

Recently it has been disclosed in the art that ZSM-5 can be added to an FCC catalyst to enhance the production of $C_4$–$C_5$ olefins.

In an article titled, "Octane Enhancement in Fluid Catalytic Cracking I. Role of ZSM-5 Addition and Reactor Temperature" J. Biswás, et al., *Applied Catalysis* (1990) 1–18, there is a discussion of the fact that addition of ZSM-5 to an FCC catalyst causes significant losses in gasoline yield. This is also addressed in "Role of ZSM-5 and Ultrastable-Y Zeolites for Increasing Gasoline Octane Number", Madon, R. J. Journal of Catalysis, 29, 275–287 (1991).

There is a discussion of the effect of the addition of ZSM-5 to an ultra-stabilized RE-USY fluid catalytic cracking catalyst in "Effect of Operation Conditions on the Behavior of ZMS-5 to a RE-USY FCC Catalyst," M. F. Elia, et al., *Applied Catalysis* (1991) 195–216. ZSM-5 addition causes a lower gasoline yield due to selective cracking of most of the low octane number components. They found the increase of light branched olefins having high octane number is more intense at lower severities.

In a paper titled "Effect of Catalyst Properties on the Selectivities of Isobutene and Isoamylene in FCC", Cheng et al., conclude that the isobutene and isoamylene produced in FCC are below their thermodynamic equilibrium values because they are preferentially converted to isobutane and isopentane, respectively by hydrogen transfer. They state that over conventional Y-zeolite catalysts, the rate of hydrogen transfer to branched $C_4$ and $C_5$ olefins is about one order of magnitude faster than to linear $C_4$ and $C_5$ olefins. They assert that if hydrogen transfer to tertiary carbenium ions could be suppressed beyond what is feasible with Y-zeolite catalysts, the yield of isobutene and isoamylene could be increased.

The use of ZSM-5 in a multiple component catalyst for cracking is disclosed in U.S. Pat. No. 4,988,653 (January 1991) to Mobil which describes a tricomponent catalyst containing a Y-zeolite, [Al]-ZSM-5 and [Ga]-ZSM-5 for hydrocarbon cracking. The large pore molecular sieve catalyst cracks large hydrocarbons to lighter paraffins and olefins and converts them into aromatics. At Col. 9, lines 15–20 it is disclosed that elements which can be substituted for part of the framework aluminum in [Al]-ZSM-5 are metals heavier than aluminum. Those listed are in Groups IVB and IIIA. The exemplified substituted ZSM-5 is gallium, and is used for aliphatic aromatization (Col. 6, line 2). The effects on isoamylene production were not reported. U.S. Pat. No. 5,006,497, (April 1991), to Mobil is similar, disclosing a "quadro" catalyst which contains Ga ZSM-5 and H ZSM-5 inter alia.

A catalyst composition for catalytic cracking of a hydrocarbon oil to provide a product of increased octane number and increased $C_{5+}$ gasoline content is disclosed in U.S. Pat. No. 5,039,640 (1991) to Mobil. The catalyst composition contains a large pore crystalline molecular sieve component and an MCM-22 zeolite component.

In U.S. Pat. No. 5,102,530 to Edwards, et al., there is disclosed a method of cracking a hydrocarbon feedstock using a zeolite catalyst in the absence of added hydrogen and in the presence of a cracking catalyst having a particle size of from about 10 to 200 micrometers, said catalyst comprising zeolite Beta exchanged to a low soda level which is mixed with a matrix, said zeolite being present in a catalytically effective amount for catalytic cracking.

U.S. Pat. Nos. 3,894,933 and 3,894,934 disclose the use of mixtures of Y-zeolites and ZSM-5 zeolites for catalytic cracking. There is nothing disclosed or suggested regarding the treatment of either zeolite with phosphorus. ZSM-5 is used in industry as an FCC additive for gasoline. However, because of its high acid strength, the yield of FCC gasoline also suffers.

A few references disclose the treatment of a variety of zeolites with phosphorus.

In U.S. Pat. No. 3,972,832 there is disclosed a composition of matter comprising an aluminosilicate zeolite having a silica-to-alumina ratio of at least about 12 and a constraint index of about 1 to 12 which has been combined with at least about 0.78 percent by weight phosphorus. Zeolites which fit this limitation on Si:Al ratio and constraint index include ZSM-5, as well as ZSM-11, ZSM-12, ZSM-21, TEA, mordenite and "similar materials". The suggested use is for conversion of aliphatic compounds. This reference discloses that higher olefin to paraffin product ratio can be obtained from hydrocarbon conversions using phosphorus-containing ZSM-5 as compared to using ZSM-5 without phosphorus.

In U.S. Pat. No. 5,110,776 there is disclosed a method for preparing a zeolite containing catalyst for use in catalytic cracking comprising modifying a zeolite by treating the zeolite with a phosphate, wherein the zeolites which can be treated include the large pore X, Y, USY, REX, REY, RE-USY, dealuminated Y, and silica-enriched dealuminated Y; the intermediate pore zeolites ZSM-5, ZSM-11, ZSM-22, ZSM-23, ZSM-35, ZSM-48, ZSM-57 and the small pore zeolites erionite and ZSM-34. The invention of U.S. Pat. No. 5,110,776 is directed toward a variety of individual zeolites and the suggested feedstock (Col. 4, lines 65–68) is resids. There is no suggestion of using phosphorus containing ZSM-5 as an additive. Furthermore, data shown in their Example 15, Table III were obtained from experiments carried out at 760° F., a temperature lower than the temperatures typically used in catalytic cracking process, i.e., 800°–1200° F. Upon adding phosphorus to Y-zeolites, they observed some butene yield increase but the gasoline yield decreased.

In European Patent Application No. 397,183 there is disclosed a phosphorus modified USY zeolite as a sole cracking catalyst. No usage of phosphorus modified ZSM-5 is included. In contrast to U.S. Pat. No. 5,110,776, the data shown in their Table II indicate that when compared at comparable conversion, the yield of $C_1$ to $C_4$ products is lower but the gasoline yield is higher from the phosphorus modified USY than from the unmodified USY.

Therefore contradictory results were demonstrated in the prior art regarding the effects of phosphorus on the yields of butene and gasoline during catalytic cracking. No prior art teaches modifying only one zeolite component with phosphorus in a catalyst mixture. The instant invention can be distinguished from the prior art in that a phosphorus-containing medium pore zeolite, e.g. ZSM-5, is added to an FCC catalyst containing large pore zeolites. Our present invention reveals unexpected advantages of using phosphorus modified ZSM-5 as a novel additive to catalytic cracking catalysts, and that butenes, 2-methyl-butenes and gasoline yields are enhanced upon modifying the ZSM-5 additive with phosphorus.

U.S. Pat. No. 5,171,921 teaches a method of converting paraffin, olefin and mixtures of paraffin and olefin hydrocarbons having 3 to 20 carbon atoms to $C_2$–$C_5$ olefins which comprises contacting the $C_3$–$C_{20}$ hydrocarbons at 300°–1000° C. and 10–1000 hr.$^{-1}$ WHSV with a catalyst comprised of steam activated ZSM-5 having a surface Si:Al ratio of 20–60 and containing 0.1–10 wt % phosphorus, said ZSM-5 being steam activated at 500°–700° C. after incorporation of said phosphorus therein. There is nothing disclosed regarding the combined use of a conventional FCC catalyst such as, for example, REY, with phosphorus-containing ZSM-5.

References available in the art do not discuss improved yields of isobutylene and methyl-butenes from the FCCU. Some discuss modification with phosphorus of a variety of zeolites. None of the references discuss the use of a particular phosphorous modified zeolite as a FCCU additive for improved conversion of certain compounds with minimal sacrifice of gasoline produced.

It would represent a distinct advance in the art if, in a method for cracking hydrocarbons to lighter products, it were possible to enhance the yield of $C_4$/$C_5$ olefins which could be used as precursors for MTBE and TAME, while at the same time, decreasing the loss in gasoline yield which is usually typical where ZSM-5 is used as an additive in a FCC process.

SUMMARY OF THE INVENTION

In accordance with the foregoing the improved process of the instant invention for enhancing the yield of $C_4$/$C_5$ olefins, reducing loss of gasoline yield, and promoting the isomerization of $C_4$/$C_5$ olefins in a catalytic cracking process comprises:

passing said charge into contact with a catalyst at a catalyst to oil ratio of 0.1 to 10, a temperature of 800° F. to 1200° F., a pressure of 0 to 150 psig, in the absence of added hydrogen, wherein said catalytic cracking catalyst may be formed in various ways including:
(i) spray drying a phosphorus-containing medium pore zeolite with a matrix to form an FCC additive having particle sizes of 40–200 micron, mechanically mixing said additive with an FCC catalyst comprising Y-zeolite such that the weight ratio of the phosphorus-containing medium pore zeolite to Y-zeolite is 0.005 to 0.10, (ii) mixing both a phosphorus-containing medium pore zeolite and Y-zeolite with a matrix and spray drying to form an FCC catalyst such that the weight ratio of the phosphorus-containing medium pore zeolite to Y-zeolite is 0.005 to 0.10.

DETAILED DESCRIPTION OF THE INVENTION

The improved method of this invention for enhancing $C_4/C_5$ olefin production in a catalytic cracking process will work in conventional FCC units processing conventional cracking feeds, such as gas oils and vacuum gas oils, using conventional FCC catalysts typically prepared by mixing Y-zeolite with a matrix and spray drying to form particles of 40–200 micron sizes.

The Y-zeolite may include a Y-zeolite selected from the group consisting of (i) the ammonium form of dealuminated Y-zeolite having a silica-to-alumina mole ratio of 6-120, (ii) a hydrogen form of dealuminated Y-zeolite having a silica-to-alumina mole ratio of 6-120, (iii) a metal exchanged dealuminated Y-zeolite having a silica to alumina mole ratio of 6-120 and a lattice constant of about 24.20–24.56 Å, which charge is particularly characterized by the presence of secondary pores of diameter of about 100–600Å.

Dealuminated Y-zeolites which may be employed may include ultrastable Y-zeolites, super ultrastable Y-zeolite, etc.

The charge zeolite may be preferably in the hydrogen form, the ammonium form, or in an exchanged form, i.e., a form in which any alkali metal present has been exchanged for, e.g., one or more rare-earth metals. Alkali metal is present preferably in amount of less than about 0.5 wt %. The preferred form is the commercial hydrogen form.

Suitable charge zeolites include: Zeolite L, Zeolite beta, Zeolite X, Zeolite Y, and preferably higher silica forms of zeolite Y such as Dealuminized Y (DAY Y; U.S. Pat. No. 3,442,795); Ultrastable Y (USY; U.S. Pat. No. 3,449,070), Ultrahydrophobic Y (UHP-Y U.S. Pat. Nos. 4,331,694; 4,401,556) and similar materials are preferred. Zeolite beta (U.S. Pat. No. 3,308,069) or Zeolite L (U.S. Pat. Nos. 3,216,789; 4,544,539; 4,554,146 and 4,701,315) may also be used. The cited patents describe preparation and are incorporated herein by reference. These materials may be subjected to conventional treatments, such as impregnation or ion exchange with rare-earths to increase stability.

These large-pore molecular sieves have a geometric pore opening of about 7 angstroms in diameter. In current commercial practice, most of the cracking of large molecules in the feed is done using these large pore molecular sieves.

A charge zeolite which provided good results as will be demonstrated in the Example was a RE-USY zeolite catalyst.

The zeolites which are modified with phosphorus-containing compounds and added to the base catalyst as additives in the present invention comprise medium pore pentasil zeolites, including, but not limited to ZSM-5. ZSM-5 is used in industry as an FCC additive for producing gasoline of higher octane number, however because of its high acid strength, the yield of FCC gasoline also suffers.

An article titled "Molecular Sieve Catalysts," by J. Ward, Applied Industrial Catalysis, Vol. 3, Ch. 9, p. 271 (1984) provides an overview of the structure of pentasils. These zeolites, as well as silicalite have $SiO_2$—$Al_2O_3$ ratios greater than 10. Silicalite usually has a Si:Al ratio greater than 200. Silicalite, ZSM-5, ZSM-11 and related materials have structures with ten-ring channel systems in contrast with the eight-membered zeolites such as A and erionite and the twelve-membered systems such as zeolites X and Y.

Pentasil zeolites are hydrophobic compared with A, X and Y zeolites. ZSM-5 has orthorhombic unit cells, whereas ZSM-11 is tetragonal.

The pentasil structures are very thermal and acid stable. They are synthesized in the presence of organic ammonium ions, which become an integral part of the structure. Heating up to 600° C. decomposes the organic cations leaving the highly porous structure.

The channel size of pentasil materials is intermediate between, for example, small pore erionite and large pore zeolite Y.

Other ZSM series zeolites are not considered to be pentasils. ZSM-21, ZSM-35 and ZSM-38 are considered to be of the ferrierite type zeolite. ZSM-20 is considered of the faujasite type and ZSM-34 is considered to be of the offretite/erionite group. T. E. Whyte, et al., Catal. Rev.-Sci. Eng. 24 (4), pp. 567–598 (1982), p. 571.

Medium pore, pentasil-type zeolites having 10-membered oxygen ring systems include, for example, ZSM-5, ZSM-11, ZSM-22, ZSM-23, ZSM-48 and laumontite. Their framework structures contain 5-membered oxygen rings as secondary building units and they are more siliceous than previously known zeolites. In many instances these zeolites may be synthesized with a predominance of silicon and with only a very small concentration of other atoms such as aluminum; thus, these zeolites may be considered as "silicates" with framework substitution by small quantities of other elements such as aluminum. Among the zeolites in this group, only ZSM-5 and ZSM-11 have bidirectional intersecting channels, the others have nonintersecting unidirectional channels.

The medium-pore pentasils, unlike other zeolites, have pores of uniform dimension and have no large supercages with smaller size windows. This particular feature is believed to account for their unusually low coke-forming propensity in acid-catalyzed reactions. Because the pentasil zeolites are devoid of the bottle-necks in the window/cage structure, molecules larger than the size of the channel do not form with the exception perhaps at the intersections.

In the instant examples ZSM-5 was modified using phosphorus-containing compounds. Any phosphorus-containing compound having a covalent or ionic constituent capable of reacting with hydrogen ion may be employed such as, for example, phosphoric acid, phosphines and phosphites. Suitable phosphorus-containing compounds include derivatives of groups represented by $PX_3$, $RPX_2$, $R_2PX$, $R_1P$, $R_3P=O$, $RPO_2$, $RP(O)(OX)_2$, $R_2P(O)OX$, $RP(OX)_2$, $ROP(OX)_2$ and $(RO)_2POP(OR)_2$ where R is an alkyl or phenyl radical and X is hydrogen, R or halide. These compounds include primary, $RPH_2$, secondary, $R_2PH$, and tertiary, $R_3P$, phosphines such as butyl phosphine; the tertiary phosphine oxides, $R_3PO$, such as tributylphosphine oxide; the primary $RP(O)(OX)_2$ and secondary $R_2P(O)OX$, phosphonic acids such as benzene phosphonic acid; the esters of the phosphonic acids such as diethyl phosphonate, $(RO)_2P(O)H$, dialkyl alkyl phosphonates, $(RO)_2P(O)R$, and alkyl dialkylphosphinates, $(RO)P(O)R_2$; phosphinous acids, $R_2POX$, such as diethylphosphinous acid, primary $(RO)P(OX)_2$, secondary, $(RO)_2POX$ and tertiary, $(RO)_3P$, phosphites; and esters thereof such as the monopropyl ester, alkyl dialkylphosphinites, $(RO)PR_2$ and dialkyl alkylphosphonite, $(RO)_2PR$ esters. Examples of phosphite esters include trimethylphosphite, triethylphosphite, diisopropylphosphite, butylphosphite; and pyrophospites such as tetraethylpyrophosphite. The alkyl groups in the mentioned compounds contain 1 to 4 carbon atoms.

Other suitable phosphorus-containing compounds include the phosphorus halides such as phosphorus trichloride, bromide and iodide, alkyl phosphorodichloridites, $(RO)PCl_2$, dialkyl phosphorochloridites, $(RO)_2PX$, dialkylphosphinochloridites, $R_2PCl$, alkyl alkylphosphonochloridates, $(RO)(R)P(O)Cl$, and dialkyl phosphinochloridates, $R_2P(O)Cl$.

Preferred phosphorus-containing compounds include: phosphoric acid, ammonium dihydrogen phosphate, trimethyl phosphite and phosphorus trichloride. Example I and Table III demonstrate the advantages of phosphoric acid treated ZSM-5 additives.

It is believed that the constituent of the phosphorus-containing compound capable of reacting with a hydrogen ion reacts with the hydrogen of the original zeolite. This would suggest that the phosphorus may be chemically bonded to the crystal structure of the zeolite since phosphorus-containing zeolites can be used for extended periods of time at high temperatures without loss of phosphorus. Further, it is not likely the phosphorus is present as a crystalline framework constituent, i.e., it has not been substituted for silicon or aluminum atoms, since the unit cell dimensions of the zeolite are unchanged on incorporation of the phosphorus atoms.

Incorporation of the phosphorus with the zeolite provides a composition having unique properties as a catalytic agent. The zeolites possess strong acid sites. On the other hand, the phosphorus-containing zeolite does not possess these strong acid sites. The phosphorus-containing zeolite possesses a greater number of acid sites than the parent zeolite but these sites appear to have a lesser acid strength than those found in the parent zeolite. It is believed that the apparent replacement of the strong acid sites with a greater number of relatively weak acid sites may be responsible for the unique catalytic properties of the phosphorus-containing zeolite.

Reaction of the zeolite with the phosphorus-containing compound is effected by contact. Where the phosphorus-containing compound is a liquid, said compound can be in solution in a solvent at the time contact with the zeolite is effected. Any solvent relatively inert with respect to the phosphorus-containing compound and the zeolite may be employed. Suitable solvents include aliphatic, aromatic or alcoholic liquids. Where the phosphorus-containing compound is trimethylphosphite or liquid phosphorus trichloride, a hydrocarbon solvent such as n-octane may be employed. The phosphorus-containing compound may be used without a solvent, i.e., may be used as a neat liquid. Where the phosphorus-containing compound is in the gaseous phase, such as where gaseous phosphorus trichloride is employed, the phosphorus-containing compound can be used by itself or can be used in admixture with a gaseous diluent relatively inert to the phosphorus-containing compound and the zeolite such as air or nitrogen.

Preferably, prior to reacting the zeolite with the phosphorus-containing compound, the zeolite is dried. Drying can be effected in the presence of air. Elevated temperatures may be employed. However, the temperature should not be such, as mentioned hereinafter, that the crystal structure of the zeolite is destroyed.

Heating of the phosphorus-containing catalyst subsequent to preparation and prior to use is also preferred. The heating can be carried out in the presence of oxygen, for example air. Heating can be at a temperature of about 150° C. However, higher temperatures, i.e., up to about 500° C. are preferred. Heating can be carried out for 1–24 hours. It has been found that heating increases the catalyst efficiency of the phosphorus-containing zeolite probably due to an increase in the number of acid sites rather than an increase in the strength of the existing acid sites. Increasing the heating temperature increases the catalyst efficiency. However, while heating temperatures above about 500° C. can be employed, they are not necessary. At temperatures of about 1000° C., the crystal structure of the zeolite is destroyed.

The amount of phosphorus incorporated with the crystal structure of the phosphorus-containing zeolite should be at least 0.1% by weight. With this amount of phosphorus, replacement of a sufficient proportion of the strong acid sites of the zeolite with an increased number of weaker acid sites is effected. In order to accomplish this it is preferred that the amount of phosphorus in the phosphorus-containing zeolite be at least about 0.5% by weight. The amount of phosphorus can be as high as 10% by weight, although with these higher amounts a decline in catalytic activity can occur.

As discussed above, ZSM-5 selectively cracks gasoline range aliphatic molecules to form additional light olefins at the penalty of gasoline yield. Using phosphorus-containing ZSM-5 as FCC additives instead can reduce the gasoline yield loss and still effectively enhance light olefin yields. The yields of 2-methyl-butenes and n-butenes also increase when using phosphorus-containing ZSM-5 as the additive, due to its more moderate acid strength. Untreated ZSM-5, on the other hand, will further crack these C5 and C4 olefins due to its high acid strength. Therefore, when phosphorus-containing ZSM-5 zeolites are used as additives to cracking catalysts, the yields of 2-methyl-butenes, n-butenes, and gasoline are improved over using the corresponding untreated ZSM-5 as an additive.

The following examples are presented only to illustrate the invention. The invention is not intended to be limited thereby.

EXAMPLE 1—Catalyst Preparation

Neat ZSM-5 zeolite powder from Engelhard Corporation (2226-CT-90) was impregnated with various amounts of phosphorus as follows. Three grams of ZSM-5 was first treated with an aqueous solution of phosphoric acid and was then dried in a Rotavapor apparatus. The recovered zeolite powder was calcined in air at 500° C. for 1 hour. Three P/ZSM-5 samples with 0.5 wt %, 2.0 wt %, and 4.0 wt % of phosphorus loading were prepared and designated as 3058-CT-91, 3048-CT-91 and 3055-CT-91, respectively.

EXAMPLE 2—Catalyst Evaluation

An equilibrium FCC catalyst containing REUSY (properties shown in Table I) was used as the base catalyst. It was mechanically mixed with 2 wt % of various additives for microactivity test (MAT) using a gas oil (properties shown in Table II) under the following conditions:

Temperature =960° F.

Catalyst load (including additive) =4 g

Feed injection time =23 sec

WHSV =32 h$^{-1}$

Cat/Oil =5

Table III presents the advantages of phosphoric acid treated ZSM-5 additives over the untreated ones. As the loading of phosphorus on the ZSM-5 additive increases, the yield enhancement in 2-methyl-1-butene and 2-methyl-2-butene (feedstocks for TAME units) over the base-catalyst-only case also increases. A similar trend of yield enhancement can be seen with n-butenes (feedstocks for alkylation units).

The yield of isobutylene (feedstock for MTBE units) is maintained within similar range for ZSM-5 additives loaded with 0–2 wt % phosphorus. It starts to drop somewhat only when the phosphorus loading reaches 4 wt % but still a significant improvement over the base catalyst without any additives.

Furthermore, the introduction of ZSM-5 type additives into the base catalyst enhances light olefin yield at the expense of gasoline yield. Treating ZSM-5 with phosphoric acid clearly alleviates the gasoline yield loss.

EXAMPLE 3—Catalyst Evaluation

An equilibrium FCC catalyst containing REUSY (properties shown in Table I) was used as the base catalyst. It was mechanically mixed with 2 wt % of various additives for microactivity test (MAT) using another gas oil sample (properties shown in Table IV) under the following conditions:

Temperature = 960° F.
Catalyst load (including additive) = 4 g
Feed injection time = 38 sec
WHSV = $30h^{-1}$
Cat/Oil = 3

Table V shows as the loading of phosphorus on the ZSM-5 additive increases, the yield enhancement in n-butenes over the base-catalyst-only case also increases until it levels out at 2 wt % phosphorus content. The yield of isobutylene is maintained within similar range for ZSM-5 additives loaded with 0–0.5 wt % phosphorus. It starts to decrease only when the phosphorus loading reaches 2 wt % but still is significantly improved over the base catalyst without any additives. Furthermore, the loss in gasoline yield due to the introduction of ZSM-5 type additives into the base catalyst reduces as more and more phosphorus is impregnated onto ZSM-5.

TABLE I

Properties of the Equilibrium Catalyst Used as the Base Catalyst in Example 2

| | |
|---|---|
| $Al_2O_3$ | 35.4 wt % |
| $SiO_2$ | 59.1 wt % |
| $Na_2O$ | 0.47 wt % |
| Nickel | 270 ppm |
| Vanadium | 700 ppm |
| BET Surface Area | 153 m²/g |
| Pore Volume | 0.36 cc/g |
| Unit Cell Size | 24.31 Å |

TABLE II

Properties of the Gas Oil Used in Example 2

| | |
|---|---|
| API Gravity | 21.4 |
| Pour Point | 91° F. |
| Aniline Point | 163° F. |
| Sulfur | 2.52 wt % |
| Vanadium | <1.0 ppm |
| Nickel | <1.0 ppm |

TABLE II-continued

Properties of the Gas Oil Used in Example 2

| | |
|---|---|
| Paraffins | 8.6 wt % |

TABLE III

Product Yield Enhancement Achieved by Mixing 2 wt % of phosphoric Acid Treated ZSM-5 Additives into the Base Catalyst as Described in Example 2

| Run No. | 986 | 999 | 009 | 017 | 003 |
|---|---|---|---|---|---|
| Additive Type | Base Cat Only | Base Cat + ZSM-5 (0% P) | Base Cat + P/ZSM-5 (0.5% P) | Base Cat + P/ZSM-5 (2% P) | Base Cat + P/ZSM-5 (4% P) |
| Conversion | 71 | 73 | 73 | 73 | 72 |
| Product | | | wt % Yield | | |
| 2-Methyl-Butenes | 1.32 | 1.41 | 1.50 | 1.63 | 1.85 |
| n-Butenes | 4.05 | 4.05 | 4.27 | 4.62 | 4.95 |
| Isobutene | 1.09 | 2.56 | 2.63 | 2.55 | 2.31 |
| Gasoline | 46.1 | 29.5 | 30.4 | 32.3 | 34.6 |

TABLE IV

Properties of the Gas Oil Used in Example 3

| | |
|---|---|
| API Gravity | 27.4 |
| Pour Point | 52° F. |
| Aniline Point | 169° F. |
| Sulfur | 0.001 wt % |
| Vanadium | <1.0 ppm |
| Nickel | <1.0 ppm |
| Paraffins | 3.5 wt % |

TABLE V

Product Yield Enhancement Achieved by Mixing 2 wt % of Phosphoric Acid Treated ZSM-5 Additives into the Base Catalyst as Described in Example 3

| Run No. | 249 | 251 | 321 | 306 | 331 |
|---|---|---|---|---|---|
| Additive Type | Base Cat Only | Base Cat + ZSM-5 (0% P) | Base Cat + P/ZSM-5 (0.5% P) | Base Cat + P/ZSM-5 (2% P) | Base Cat + P/ZSM-5 (4% P) |
| Product | 77 | 74 | 75 | 76 | 76 |
| | | | wt % Yield | | |
| n-Butenes | 3.48 | 3.81 | 3.97 | 4.20 | 4.13 |
| Isobutene | 0.90 | 2.47 | 2.49 | 2.03 | 1.30 |
| Gasoline | 58.9 | 37.5 | 39.2 | 45.7 | 52.0 |

What is claimed is:

1. In a fluid catalytic cracking process comprising
   admixing a hydrocarbon charge stock with an FCC catalyst in the bottom section of a reactor riser at a 0.1 to 10 catalyst to oil ratio,
   passing the mixture of the hydrocarbon charge stock and the catalyst through the riser,
   thereby volatilizing the hydrocarbon charge stock and effecting cracking thereof to obtain gaseous products comprising hydrogen, C1 to C5 paraffins, olefins having 2 to 5 carbon atoms per molecule, and substantially liquid products,
   and substantially separating said gaseous products from said liquid products and solid cracking catalyst, the improvement, allowing for enhanced $C_4/C_5$ olefin yield and decreased loss of gasoline yields, comprising using a catalyst formed by a method selected from:
(i) spray drying a phosphorus-containing medium pore zeolite with a matrix to form a FCC additive having particle sizes of 40–200 microns and mechanically mixing said additive with a FCC catalyst comprising a Y-zeolite in proportions such that the weight ratio of the phosphorus-containing medium pore zeolite to Y-zeolite is 0.005 to 0.10,
(ii) mixing both phosphorus-containing medium pore zeolite and Y-zeolite with a matrix and spray drying to form an FCC catalyst having a weight ratio of phosphorus-containing medium pore zeolite to Y-zeolite of 0.005 to 0.10.

2. The process of claim 1 wherein the $C_4/C_5$ olefin yields which are enhanced are n-butenes and 2-methyl-butenes.

3. The process of claim 1 wherein the hydrocarbon charge stock is gas oil.

4. The process of claim 1 wherein the temperature is 800° to 1200° F.

5. The process of claim 1 wherein the weight ratio of medium pore phosphorus-containing ZSM-5 to Y-zeolite is 0.01 to 0.05.

6. The process of claim 1 wherein the weight ratio of medium pore phosphorus-containing ZSM-5 zeolite to Y-zeolite is 0.01 to 0.03.

7. The process of claim 1 wherein the pressure is 0 to 150 psig.

8. The process of claim 1 wherein the Y-zeolite is selected from the group consisting of Rare-Earth Y (REY), Dealuminized Y (DAY), Ultrastable Y (USY), and Rare-Earth containing Ultrastable Y (RE-USY).

9. The process of claim 8 wherein the Y-zeolite is rare-earth containing Ultrastable Y (RE-USY).

10. The process of claim 1 wherein the phosphorus-containing medium pore zeolite is selected from the group consisting of ZSM-5 and ZSM-11.

* * * * *